Aug. 22, 1950        G. H. BROWN        2,519,433
CORDLESS ELECTRIC TEAKETTLE
Filed Oct. 29, 1945        2 Sheets-Sheet 1
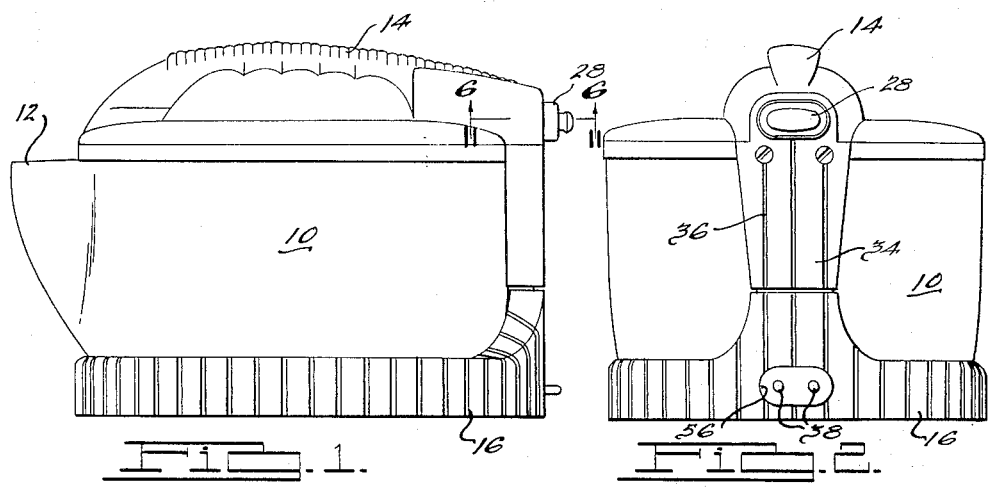
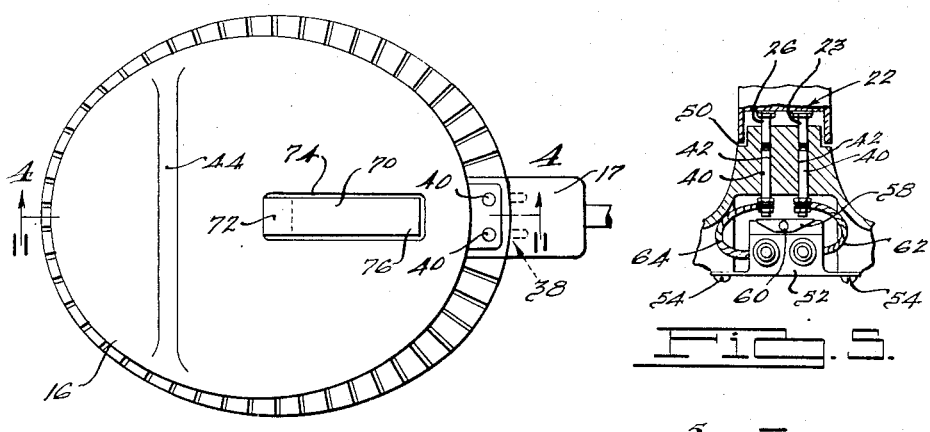
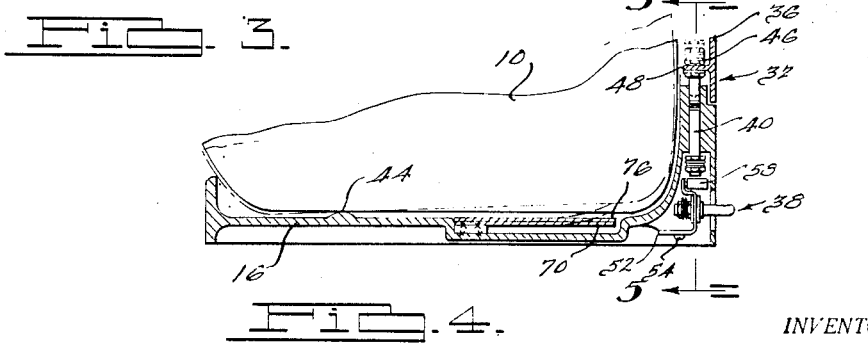
INVENTOR.
Gordon H. Brown.
BY
Edwin J. Balluff
ATTORNEY.

Aug. 22, 1950 G. H. BROWN 2,519,433
CORDLESS ELECTRIC TEAKETTLE
Filed Oct. 29, 1945 2 Sheets-Sheet 2
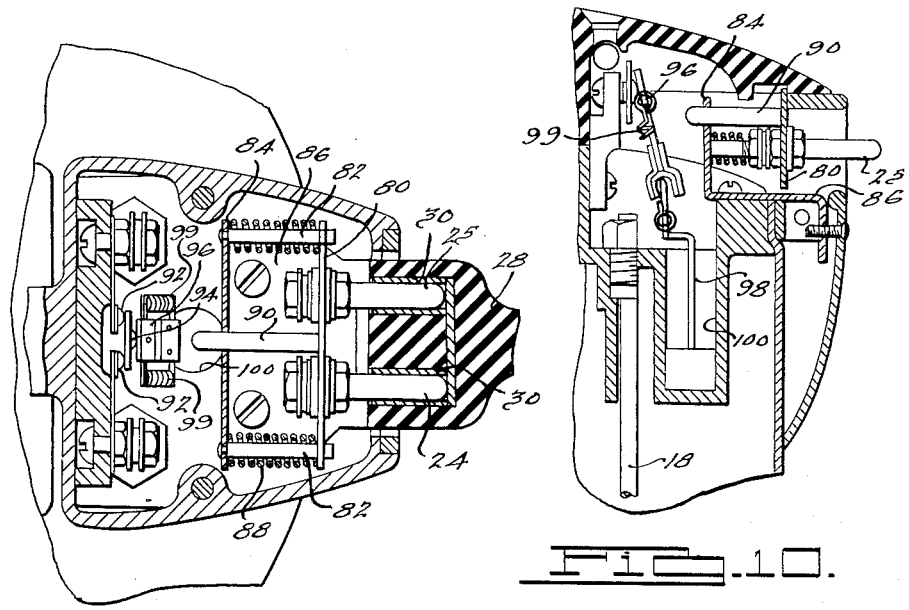
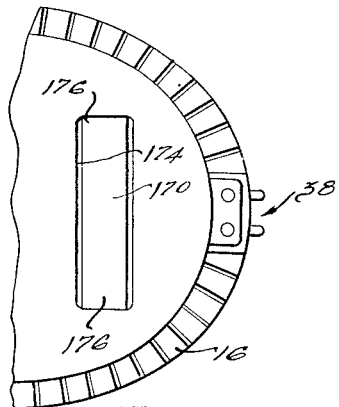
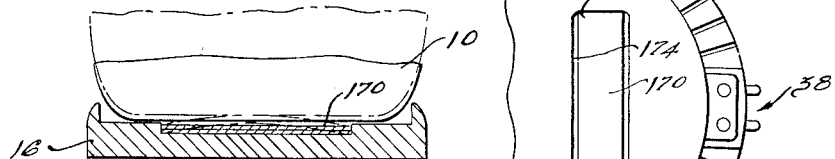
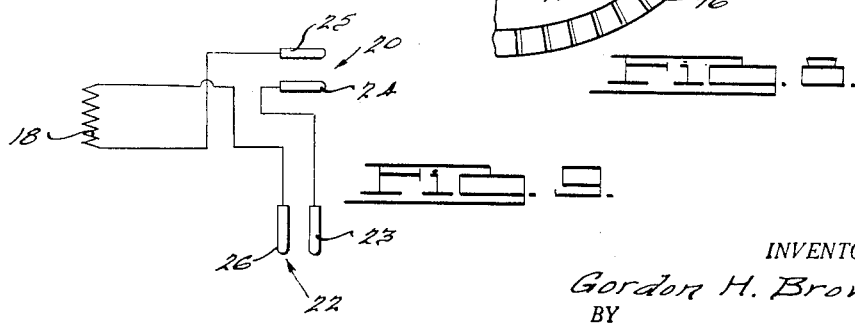
INVENTOR.
Gordon H. Brown.
BY
Edwin J Balluff
ATTORNEY.

Patented Aug. 22, 1950

2,519,433

UNITED STATES PATENT OFFICE 2,519,433

CORDLESS ELECTRIC TEAKETTLE

Gordon H. Brown, Detroit, Mich.

Application October 29, 1945, Serial No. 625,264

9 Claims. (Cl. 219—43)

1

This invention relates to electric teakettles and has particular reference to a new and improved construction for electric teakettles.

Principal objects of the invention are to provide:

A new and improved electric teakettle;

A cordless electric teakettle;

An electric kettle and separate base therefor, each provided with terminals so that a current conducting cord may be attached directly to the teakettle or to the base, and wherein the kettle and base are provided with means for closing the circuit through the heating element in the kettle when the kettle is arranged on the base;

An electric teakettle embodying the construction and features hereinafter set forth;

A cordless electric teakettle including a base and provided with thermally responsive means by which the temperature of the kettle and its contents may be controlled.

Other and further objects of the invention will be apparent from the following description and claims and will be understood by reference to the accompanying drawings, of which there are two sheets, which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims. I also contemplate that of the several different features of my invention, certain ones thereof may be advantageously employed in some applications separate and apart from the remainder of the features.

In the drawings:

Fig. 1 is a side elevational view of an electric teakettle embodying the invention;

Fig. 2 is a rear elevational view thereof;

Fig. 3 is a plan view of the base with the kettle removed;

Fig. 4 is an enlarged sectional view through the kettle and its base and taken generally in a plane along the line 4—4 of Fig. 3;

Fig. 5 is a fragmentary sectional view taken generally in a plane along the line 5—5 of Fig. 4;

Fig. 6 is an enlarged fragmentary sectional view taken generally along the line 6—6 of Fig. 1;

Fig. 7 is a fragmentary cross sectional view of a kettle and its base, and illustrating a modified form of the invention;

2

Fig. 8 is a fragmentary plan view of the base illustrated in Fig. 7;

Fig. 9 is a diagrammatic illustration of the circuit for the heating element and its terminals; and Fig. 10 is a fragmentary vertical sectional view through the thermostatic safety switch.

As illustrated in the embodiment of the invention shown in Figs. 1 to 6, an electric teakettle may comprise a kettle 10 forming a vessel for holding liquid to be heated and having a pouring and filling spout 12, a handle 14, and a base 16. The kettle 10 is internally provided with an electric resistance heating element 18 (Fig. 9) which is arranged in the lower part of the kettle and so as to be submerged in the liquid to be heated therein.

For a more complete disclosure of the construction of the kettle and its associated elements, reference may be had to my copending applications Serial No. 539,201, filed June 7, 1944, for "Electric Teakettle and Cover Assembly"; Serial No. 578,137, filed February 16, 1945, for "Safety Switch and Resetting Mechanism Therefor"; and Serial No. 605,740, filed July 18, 1945 now Patent No. 2,489,560, for "Electric Teakettle."

The teakettles disclosed and/or claimed in such applications are adapted to have a terminal plug, such as that indicated at 17, of a current conductor detachably connected thereto, as is the case in the construction disclosed in this application. However, in this application the construction disclosed and claimed contemplates an electric teakettle which is of the cordless type that is, one in which the cord is not attached directly to the kettle. However, the present application also contemplates an arrangement by means of which the terminal plug of the current conductor may be optionally connected directly to the kettle.

As shown in Fig. 9, the kettle is provided with two sets of terminals or contacts 20 and 22. The terminals 23 and 24 are electrically interconnected, while the other terminals 25 and 26 are electrically connected to the electric resistance heating element 18. In order that the circuit through the heating element 18 will be completed when the terminal plug 17 is attached to one of the sets of terminals, a dummy plug 28, as shown in Fig. 6, should be attached to the other set of terminals.

The dummy plug 28 includes two electrically interconnected terminals 30 operable when the dummy plug 28 is mounted on one of the sets of terminals 20 or 22 to interconnect the terminals of such set. This dummy plug 28 thus will function to arrange the terminals of the sets 20 and 22 in series, and in addition will function to shield the set of terminals to which the terminal plug 17 of the current conductor is not attached. The set 20 of terminals for the kettle is shown in Figs. 1 and 2 with the dummy plug 28 connected thereto.

The set 22 of the terminals for the kettle is arranged in a socket 32 defined by a downwardly projecting portion 34 of the terminal housing 36 at the back end of the kettle. The dummy plug 28 is constructed and arranged so that it may be connected to either of the sets of terminals 20 or 22. In addition, the base 16 is provided with a set of terminals or contacts 38 to which the terminal plug 17 may be optionally connected. The base 16 is also provided with a set of contacts 40 which are positioned to be engaged by the set of terminals 22 on the kettle when the kettle 10 is arranged on the base 16 as shown in Figs. 1, 2, 4 and 5.

The contacts 40 comprise pins which are positioned in guides or slots 42 formed in the base 16. The base 16 may be formed by a molded plastic so as to provide a heat resistant support for the kettle 10. The base 16 includes a rib 44 upon which the front end of the kettle may rest, while the rear support for the kettle is provided by the set of terminals 22 which are fixedly secured by means of nuts 46 to a web 48 formed on the terminal housing 36, as shown in Figs. 4 and 5.

The outer walls of the terminal housing 36 at the lower end thereof form a guide for co-operation with the seat 50 formed on the base for locating the set of terminals 22 relative to the contacts 40 on the base. The terminals 38 are mounted on a bracket 52 which is screwed to the underside of the base 16 by means of screws 54, the set 38 of terminals projecting rearwardly from the base through an opening 56 in the skirt thereof.

The bracket 52 includes an upstanding portion on which the terminal pins 38 are mounted. A member 58 is pivotally mounted by means of a pin 60 on the upper end of the bracket 52, this member 58 being free to rock within limits about the pivot therefor provided by the pin 60, the pin 60 being riveted to the upstanding portion of the bracket 52. The member 58 is formed of insulating material and is adapted to form a support for the lower ends of the contacts 40, the lower ends of each of the contacts 40 resting upon the upper surface of the member 58 and arranged so that one of the contacts is on each side of the pivot 60. In this manner the contacts 40 are free to adjust themselves vertically with respect to each other so as to engage with the downwardly projecting terminals 23 and 26 of the set 22. The contacts 40 are electrically connected by wires 62 and 64 to the terminals of set 38. The pins forming the contacts 40 support the rear end of the kettle through engagement with the terminals 23 and 26 of the set 22.

From the foregoing it will thus be seen that the circuit through the heating element 18 may be completed by attaching the terminal plug 17 to any one of the three sets of contacts 20, 22 and 38. However, when the plug 17 is attached to the terminals 38, the kettle will have to be properly arranged on the base 16 in order to complete the circuit through the heating element. However, if the plug 17 is attached to either of the sets of terminals 20 or 22, the kettle need not be supported upon the base 16. The plug 28 in all instances with the circuit as illustrated in Fig. 9 would be mounted on the exposed set of terminals to which the plug 17 is not attached so as to complete the circuit through the heating element.

In order to regulate the temperature to which the contents of the kettle 10 are heated, a cantilever bimetal element 70 may be secured at one end 72 thereof of the base 16, the bimetal element 70 being arranged in a recess 74 in the base. The bimetal element 70, when cold, will assume the position as illustrated in full lines in Fig. 4. However, in this position it is exposed to radiant heat from the adjacent bottom of the kettle 10.

The bimetal element 70 is constructed and arranged so that upon being heated the end 76 thereof will be deflected as shown in dotted lines in Fig. 4 and move upwardly to engage the bottom of the kettle 10 at the rear thereof and lift the same sufficiently so as to lift the terminals of the set 22 out of engagement with the contacts 40, thereby to break the electrical circuit through the heating element 18. The rib 44 provides a rocking support for the kettle. The bimetal element 70, upon cooling, will under the weight of the vessel be returned toward its original position, thereby to reestablish engagement of the terminals 22 with the contacts 40 thereby to reclose the circuit through the heating element 18.

It is obvious that the bimetal element 70 may be constructed and arranged so as to open and close the circuit through the element 18 so as to maintain the temperature of the liquid in the kettle 10 within certain predetermined limits.

A modified form of bimetal element 170 is illustrated in Figs. 7 and 8. In this embodiment the bimetal element is arranged in a recess 174 and so that upon heating of the bimetal element 170 the same will arch and engage the bottom of the vessel 10 so as to break the circuit through the heating element 18. In this case the ends 176 of the bimetal element 170 abut the ends of the recess 174 and thereby function to maintain the bimetal element 170 in the socket 174. The bimetal elements 70 and 170 and the terminals 22 and 40 thus comprise a thermostatically operated switch which will function to keep the temperature of the contents of the kettle 10 within predetermined limits when the current conducting cord is connected to the terminals 38 on the base.

In addition to the thermostatic switch just described, the kettle 10 may include as disclosed in my aforesaid applications, a thermostatic safety switch which is operative for opening the circuit through the heating element 18 when the level of the liquid therein becomes too low due to the evaporation of the liquid. While the construction and operation of this switch is more fully disclosed in my earlier copending applications, reference may now be had to Fig. 10 for a brief statement of the construction and operation thereof. In this connection it should be observed that for some purposes it may not be necessary to include the thermostatic safety switch illustrated in Fig. 10 and/or the thermostatic switch previously described.

As shown in Fig. 10, the terminals 25 and 24 are mounted on a plate 80 which is slidably mounted on pins 82 projecting rearwardly from the upstanding portion 84 of a bracket 86. Springs 88 positioned around the pins 82 and between the upstanding portion 84 of the bracket 86 and the plate 80 function to maintain the terminals 24 and 25 normally in the position as illustrated in Fig. 10. A pin 90 projects forwardly through the upstanding portion 84 of the bracket 86 and comprises a resetting member for the thermostatic safety switch.

The safety switch comprises the resilient contacts 92 and the movable contact 94 which is carried by and on the upper end of the rockable lever 96. The lever 96 is rockably mounted on a bimetal element 98 which is arranged in a well 100 in heat conducting relationship with the ends of the arms of the heating element 18. The bimetal element 98 is constructed and arranged so that it will rock the lever 96 so as to move the contact 94 thereon away from the contacts 92 thereupon to open the thermostatic safety switch. In its open position the upper end of the lever 96 will abut the end of the pin 90.

The bimetal element 98 is constructed and arranged so that it will not reposition the contact 94 to close the contacts 92 when the kettle and the heating element cool down. Thus, the thermostatic safety switch 92, 94 comprises a switch which must be manually reset. This may be done by pushing inwardly on the plug 28 so as to move the plate 80 and the pin 90 toward the contacts 92 so that the pin 90 will engage the upper end of the lever 96 and reposition the contact 94 to bridge the contacts 92.

The thermostatic safety switch 92, 94 may be positioned in the circuit between the heating element 18 and either one of the contacts 25 or 26. Its principal function is to permanently shut off the kettle when the kettle boils dry or the level of the water therein gets too low, and it must be manually reset in order to close the circuit through the heating element.

Springs 99 connected to laterally projecting arms on lever 96 and bimetal 98 function to bias the upper end of lever 96 to its position toward one side or the other of the bimetal 98 and to snap the lever 96 past center as it rocks on the upper knife edge of the bimetal element. For a more detailed statement of the construction and operation of the thermostatic safety switch shown in Fig. 10 reference may be had to my aforesaid applications.

While I have illustrated and described preferred embodiments of my invention, it is understood that these are capable of modification, and I therefore do not wish to be limited to the precise details set forth but desire to avail myself of such changes and alterations as fall within the purview of the following claims.

I claim:

1. An electric teakettle comprising a base having a set of electric terminals to which the terminal plug of a current conducting cord may be attached, said base having a set of contacts electrically connected to said set of terminals, a kettle having a set of electric terminals to which said terminal plug of a current conducting cord may be attached, said kettle also being provided with a set of contacts arranged to engage said set of contacts on said base when said kettle is positioned thereon, said kettle being provided with an electric resistance heating element therein and means electrically connecting said element to said kettle terminals and contacts, said electrical connection between said element and said kettle terminals and contacts including a detachable plug which may be selectively attached to either of said sets of terminals.

2. An electric teakettle according to the construction set forth in claim 1 wherein thermally actuated means are arranged on said base and so as to be responsive to the temperature of said kettle, said thermally actuated means comprising a bimetallic element constructed and arranged so as when heated to engage said kettle and thereby lift the same so as to separate said contacts on said kettle from those on said base.

3. An electric teakettle comprising a base having electric terminals to which the terminal plug of a current conducting cord may be attached, said base having contacts electrically connected to said terminals, a kettle having electric terminals to which said terminal plug of a current conducting cord may be attached, said kettle also being provided with contacts arranged to engage said contacts on said base when said kettle is positioned thereon, and means for shielding one of said terminals when said terminal plug is attached to the other of said terminals, said kettle being provided with an electric resistance heating element therein electrically connected to said kettle terminals and contacts.

4. An electric teakettle according to the construction set forth in claim 3 wherein said base is provided with a thermally responsive element positioned so as to be deflected in response to the heat of said kettle, said element being positioned relative to said kettle so that upon deflection, said element will engage said kettle and lift the same thereby to separate said base contacts from those on said kettle.

5. An electric kettle having a set of terminals to which a terminal plug of a current conducting cord may be attached, said kettle being provided with a second set of terminals, said kettle being provided with an electric resistance heating element electrically connected at one end to one of the terminals of one set and at its other end to one of the terminals of the other set, the other terminals of said sets being electrically interconnected, a plug adapted to be connected to one of said sets of terminals so as to electrically interconnect the same, when said terminal plug is attached to the other, and a base having a current conducting cord attached thereto and provided with electrical contacts with which said second set of terminals on said kettle may be engaged when said kettle is operatively positioned relative to said base.

6. An electric teakettle according to claim 5 wherein said base is provided with a thermally responsive element positioned so as to be deflected in response to the heat of said kettle, said element being positioned relative to said kettle so that upon deflection, said element will engage said kettle and lift the same thereby to separate said base contacts from said second set of terminals on said kettle.

7. An electric teakettle comprising a base having terminals to which the terminal plug of a current conducting cord may be attached, said base having contacts electrically connected to said terminals, a kettle having terminals to which said plug of a current conducting cord may be attached, said kettle also being provided with contacts arranged to engage said contacts on said base when said kettle is positioned thereon, said kettle being provided with an electric resistance heating element therein electrically connected to said kettle terminals and contacts, a non-resettable thermostatic safety switch arranged to break the electrical circuit for said heating element when the liquid level in said kettle gets low, and a thermostat responsive to the heat of said kettle and operable for periodically interrupting the circuit for the heating element whenever the temperature of the kettle rises above a predetermined amount.

8. An electric teakettle comprising a base having electric terminals to which the terminal plug of a current conducting cord may be attached, said base having contacts electrically connected to said terminals, a kettle having terminals to which said plug of a current conducting cord may be attached, said kettle also being provided with contacts arranged to engage said contacts on said base when said kettle is positioned thereon, said kettle being provided with an electric resistance heating element therein electrically connected to said kettle terminals and contacts, and thermostatic means for controlling the temperature to which the contents of said kettle may rise regardless of whether said terminal plug is connected to the terminals on said base or kettle.

9. A base arranged to support an electric appliance and having electric contacts, pressure equalizing means comprising a rocker arm with which said contacts are engageable for supporting said contacts for movement relative to one another, an electric appliance provided with an electric resistance heating element, and terminals for said element arranged to engage said contacts and form at least part of the support for said appliance.

GORDON H. BROWN.

REFERENCES CITED

The following references are of record in the file of this patent:

UNITED STATES PATENTS

| Number | Name | Date |
|---|---|---|
| 799,377 | Harden | Sept. 12, 1905 |
| 1,599,912 | Naujoks | Sept. 14, 1926 |
| 1,914,334 | Stoddard | June 13, 1933 |
| 2,181,090 | Lucia | Nov. 21, 1939 |
| 2,266,090 | Smith | Dec. 16, 1941 |
| 2,350,941 | Stevenson | June 6, 1944 |